United States Patent
Marco et al.

(10) Patent No.: US 7,451,793 B2
(45) Date of Patent: Nov. 18, 2008

(54) SYSTEM FOR CONNECTING A PORTION OF CHAIN TO THE INNER RING OF AN ANTI-SKID DEVICE WITH LIMITED BULK

(75) Inventors: Arrigoni Neri Marco, Ballabio (IT); Farina Luigi, Dolzago (IT)

(73) Assignee: Thule SPA, Moltena (IT)

( * ) Notice: Subject to any disclaimer, the term of this patent is extended or adjusted under 35 U.S.C. 154(b) by 0 days.

(21) Appl. No.: 11/634,200

(22) Filed: Dec. 6, 2006

(65) Prior Publication Data

US 2007/0151647 A1    Jul. 5, 2007

(30) Foreign Application Priority Data

Dec. 30, 2005   (EP)   ................................. 05425951

(51) Int. Cl.
*B60C 27/06*   (2006.01)
(52) U.S. Cl. ..................... 152/243; 152/172; 152/231; 152/242
(58) Field of Classification Search ................. 152/171, 152/172, 217, 219, 231, 233, 243, 244, 239, 152/241, 242, 232; 59/84

See application file for complete search history.

(56) References Cited

U.S. PATENT DOCUMENTS

| 1,301,573 A | * | 4/1919 | Klopf | ........................... 24/684 |
| 1,424,347 A | * | 8/1922 | Evans | ........................ 428/578 |
| 2,194,437 A |   | 3/1940 | Stahl |  |
| 2,281,655 A |   | 5/1942 | Zippay |  |
| 2,444,462 A | * | 7/1948 | Morton | ....................... 152/242 |

OTHER PUBLICATIONS

European Search Report for EP 05 42 5951 completed Apr. 5, 2006.

\* cited by examiner

*Primary Examiner*—Russell D. Stormer
*Assistant Examiner*—Kip T Kotter
(74) *Attorney, Agent, or Firm*—Nixon & Vanderhye, PC

(57) ABSTRACT

A system (5, 60) is described for connecting portions of chain (10) to the inner ring (3) of an anti-skid device (2). The portions of chain (10) comprise chains with twisted links (11).

The connecting system (5, 60) comprises a U-bolt element (50) constrained to the inner ring (3) and an end link (60) of the portion of chain (10).

The end link (60) has a twisted portion (61) connected to a twisted link (11) of the portion of chain (10) and a flat and straight portion (62) connected to the U-bolt element (50).

4 Claims, 4 Drawing Sheets

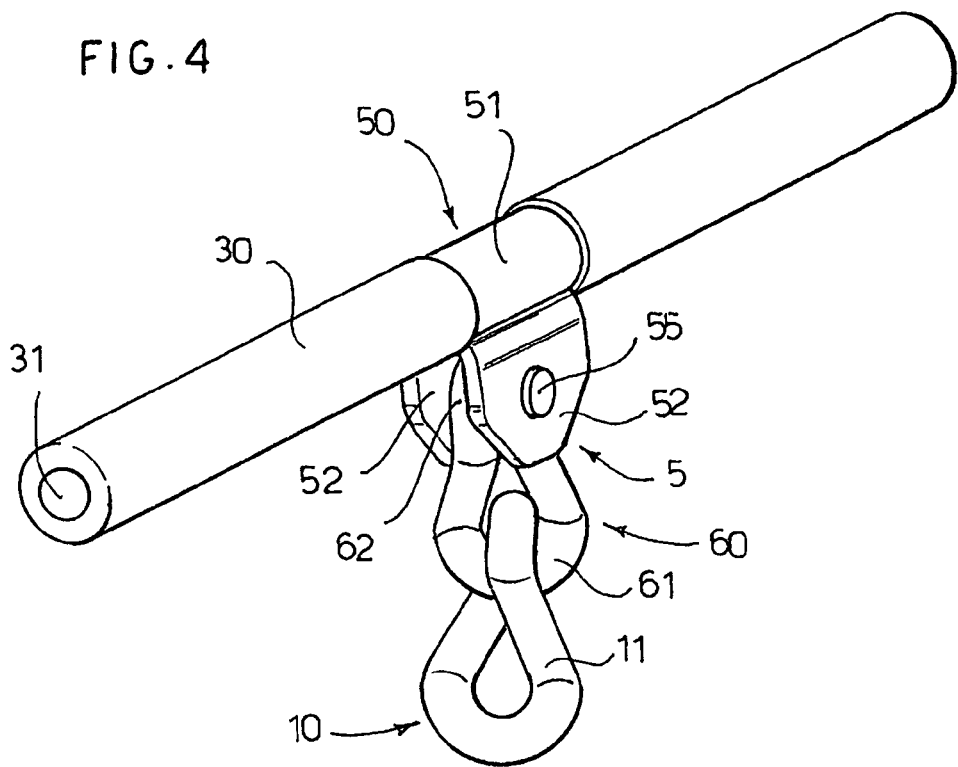
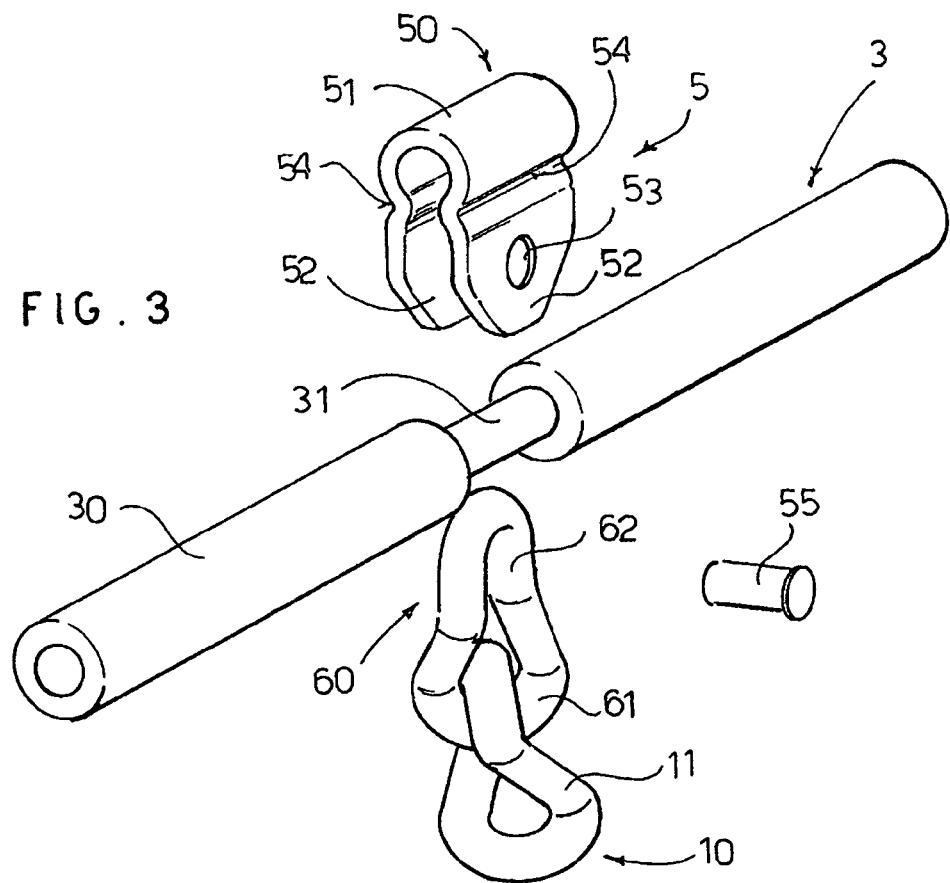

SYSTEM FOR CONNECTING A PORTION OF CHAIN TO THE INNER RING OF AN ANTI-SKID DEVICE WITH LIMITED BULK

The present invention refers to anti-skid devices or snow chains designed to be mounted on vehicle tyres and in particular to snow chains which, when mounted, have a limited bulk When a vehicle travels on a road surface covered with snow, sleet or ice, its tyres do not have a good grip and dangerous swerving or skidding of the vehicle can occur. To avoid these problems it is customary to use anti-skid devices, commonly called snow chains.

Snow chains, normally mounted on the driving wheels of the vehicle, bite into the snow and/or the ice deposited on the road surface, increasing the tread traction and allowing the vehicle tyres to achieve a good grip.

As is known, a snow chain generally consists of two side members (chains, flexible cables, steel wires, ropes or the like) which during use are closed in a ring on the inner side and the outer side of the wheel, respectively, and which will be referred to herein as the inner ring and the outer ring. These side members are connected by a series of chain portions variously disposed to achieve tread traction, the whole being completed by a tensioning device for said members, known as a tensioner.

Snow chains usually have straight links; that is, each link therein has a substantially elliptical shape and is disposed on a plane perpendicular to that of the adjacent links.

These snow chains, besides having a considerable bulk on the tread of the tyre, give rise to a considerable bulk above all on the sides thereof, also because of the joining means used. This contrasts with the increasingly great need in modern vehicles to have extremely small spaces, especially between the inner side of the tyre and the mechanical members of the vehicle.

To overcome this drawback, the same applicant has designed an anti-skid device with portions of chain with twisted links, like that described in European patent application No. 05425595.5, not yet published on the date of filing of the present application.

In the portions of chain with twisted links, each link has undergone 45° twisting around its major axis in one direction and in the opposite direction, so as to give rise to two portions of link which lie on two planes disposed at 90° to one another. The end link of a portion of twisted-link chain is connected to the inner ring by means of a U-bolt element.

Since the end link of the portions of chain is twisted, it cannot directly engage the U-bolt element; otherwise the bulk of the U-bolt element would have to be increased beyond permissible limits. To overcome this drawback, a connecting element that joins the twisted end link to the U-bolt element has been designed.

Object of the present invention is to overcome the drawbacks of the prior art by providing a system for connecting a portion of chain to the inner ring of an anti-skid device with limited bulk that has a limited number of elements and at the same time ensures a limited bulk on the sides of the tyre and thus does not interfere with the mechanical members of the vehicle.

Another object of the invention is to provide such a system for connecting the portions of chain to the inner ring of snow chains with a limited bulk that is reliable and at the same time cheap and simple to produce.

These objects are achieved in accordance with the invention with the characteristics listed in appended independent claim 1.

Preferred embodiments of the invention are apparent from the dependent claims.

The system for connecting portions of chain to the inner ring of an anti-skid device according to the invention is characterized by the fact that the portions of chain comprise twisted-link chains.

The connecting system comprises:
a U-bolt element constrained to the inner ring, and
an end link of the portion of chain having a twisted portion connected to a twisted link of the portion of chain and a flat and straight portion connected to the U-bolt element.

The particular shape of the end link of the portion of chain, which is connected to the U-bolt element, allows the bulk and the number of elements making up the connecting system to be reduced to a minimum.

Further characteristics of the invention will be made clearer by the detailed description that follows, referring to a purely exemplifying and therefore non-limiting embodiment thereof, illustrated in the appended drawings, in which:

FIG. 3 is an exploded perspective view illustrating the connecting system of the inner ring of snow chains according to the invention;

FIG. 4 is a perspective view of the connecting system of FIG. 3 assembled;

FIG. 1 shows a vehicle wheel equipped with a tyre 1 on which a snow chain, denoted as a whole by reference numeral 2, is fitted as an antiskid device.

Figure 1:
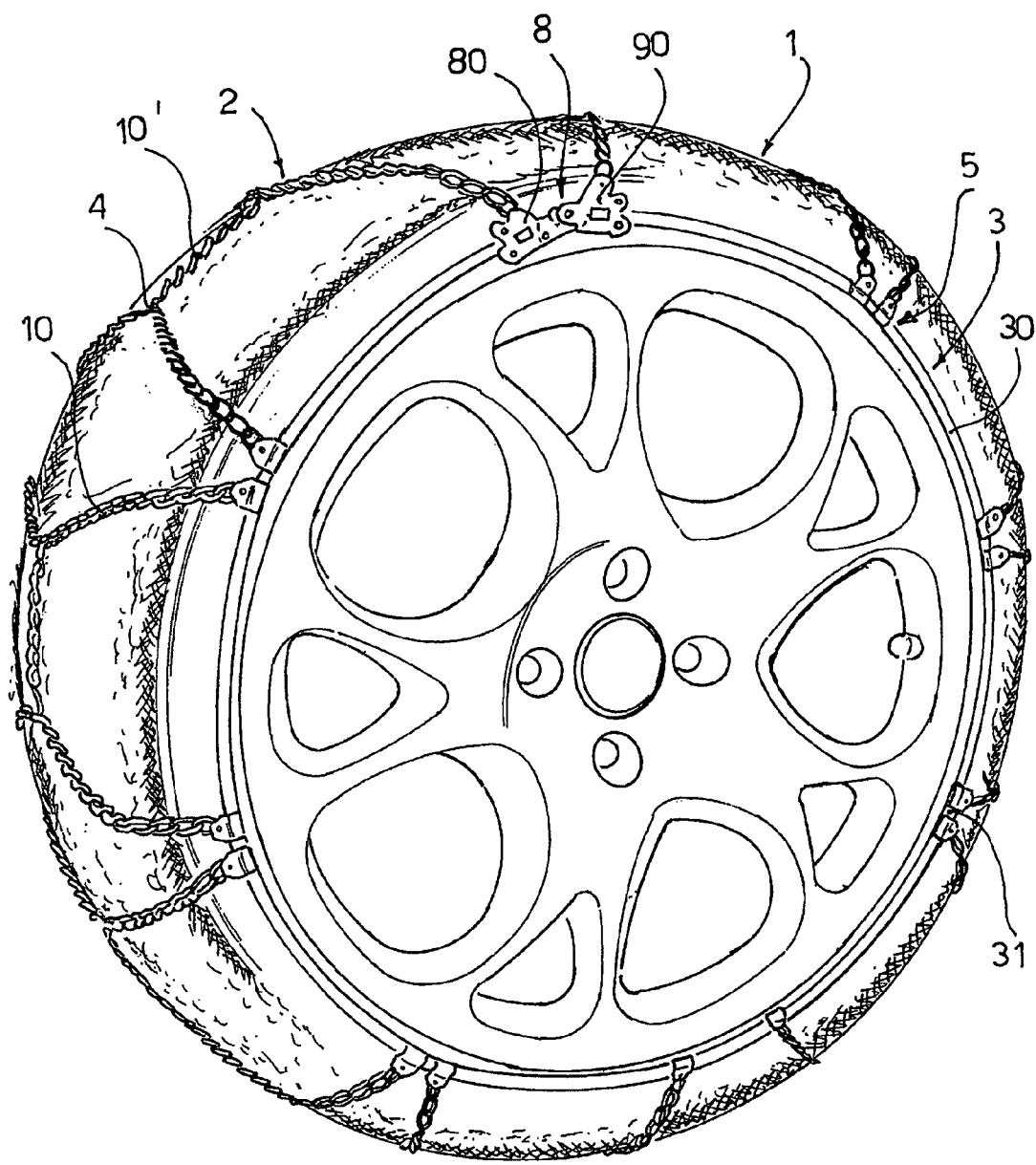
FIG. 1 is a perspective view illustrating a snow chain fitted on a tyre of a wheel shown from the side facing towards the inside of the vehicle.

The chain 2 comprises:
an element 3 which can be closed in a circle or ring on the side of the wheel destined to face towards the inside of the vehicle, henceforth called the inner ring 3,
an element (not shown) which can be closed in a circle or ring on the side of the wheel destined to face toward the outside of the vehicle, henceforth called outer ring 4, and
a series of portions of anti-skid chain (10, 10'), variously disposed on the tread of the tyre 1 of the wheel, which join the outer ring 4 and the inner ring 3.

Figure 2:
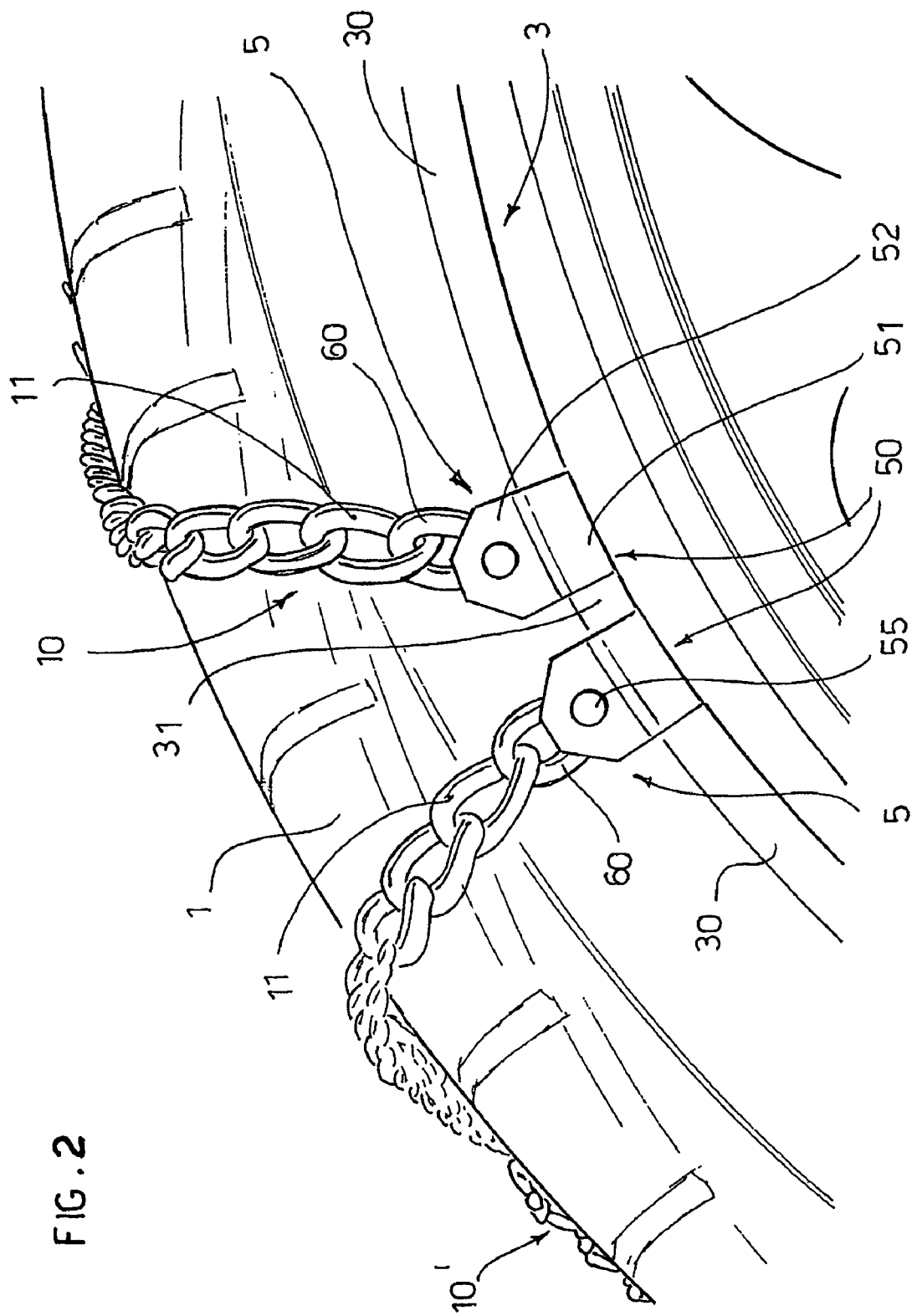
FIG. 2 is an enlarged view of a detail of FIG. 1, illustrating two connecting systems according to the invention for joining portions of chain to the inner ring of snow chains.

As shown better in FIG. 2, the portions of chain (10, 10') consist of twisted link chains; that is to say, each portion of chain (10, 10') comprises a plurality of twisted links 11, interlinked with one another. Each twisted link 11 consists of a substantially elliptical annular element, which is twisted by bending the end parts thereof by 45° in one direction and in the opposite direction, around the major axis thereof.

In this manner, each twisted link 11 has two opposite portions disposed on two planes at 90° to each other, which abut on the tyre 1 and another two opposite portions which protrude outward with respect to the tread of the tyre 1, acting as ice-breaking elements and helping to improve traction on the tyre tread.

Returning to FIG. 1, the portions of chain 10 are preferably disposed on the tyre 1 in a configuration of diamonds connected to each other by connecting portions 10' disposed along the centerline of the tread of the tyre 1. Consequently, a joining element is used to link together two portions of chain 10 which form the two sides of the diamond and the portion of connecting chain 10'.

The inner ring 3 comprises a core 31 consisting of an interrupted metal cable or of a plurality of twisted metal strands, covered with an interrupted plastic sheath 30. U-bolt connecting systems 5 are used to connect the ends of the portions of chain 10 which form the diamonds to the inner ring 3.

As shown better in FIGS. 2, 3 and 4, the U-bolt connecting system 5 comprises a U-bolt element 50 destined to be mounted on the inner ring 3.

The U-bolt element 50 is obtained from a metal plate bent in U-shape around the core 31 of the inner ring 3, so as to form a substantially semi-cylindrical portion 51 which surrounds the core 31 of the inner ring. In this manner the U-bolt element 50 can rotate around the core 31 of the inner ring.

The semi-cylindrical portion 51 of the U-bolt element 50 continues with two substantially pentagonal flat portions 52, which have two through holes 53 aligned in a transverse direction with respect to the axis of the semi-cylindrical portion 51. The flat portions 52 of the U-bolt element are disposed parallel to each other and spaced apart so as to leave an empty space between them.

Narrowings 54 defined by outer grooves and by ribs toward the inside are provided between the semi-cylindrical portion 51 and the flat portions 52, so as to avoid disengagement of the core 31 of the inner ring 3 from the semi-cylindrical portion 51 of the U-bolt element 50.

The portion of chain 10 with twisted links 11 has a last link 60 having a particular shape to enable it to be connected to the U-bolt element 50.

Figure 5:
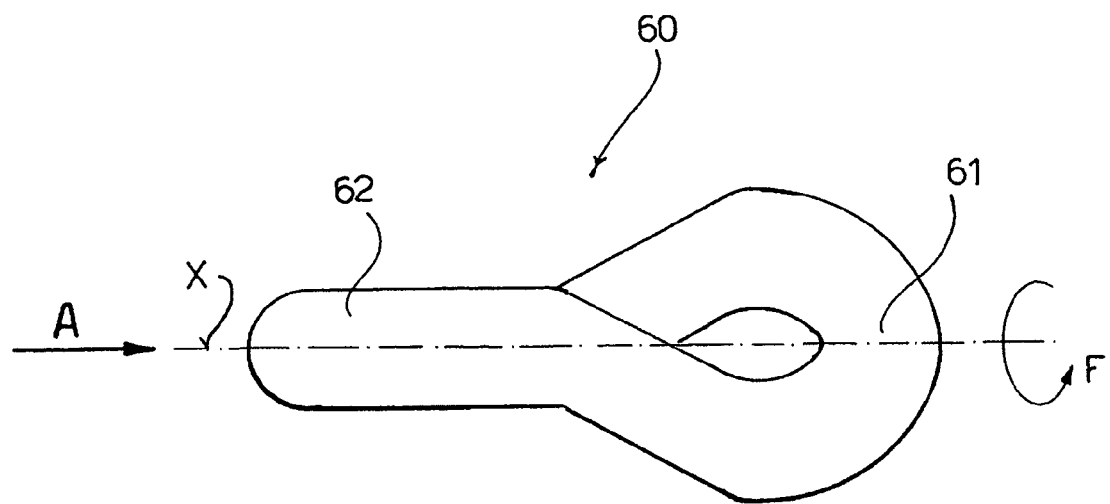
FIG. 5 is an enlarged plan view showing an end link of the portions of chain for connection to the inner ring.
Figure 6:
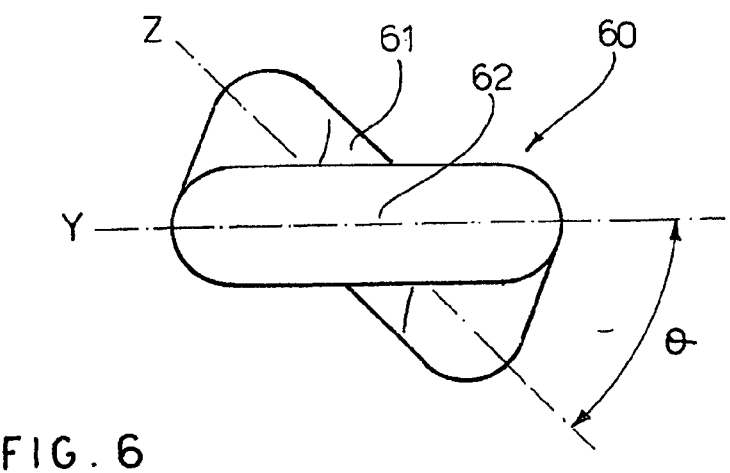
FIG. 6 is a side view taken from the direction of the arrow A of FIG. 5.

As shown also in FIGS. 5 and 6, the last link 60 has a portion 61 twisted by an angle θ of about 45° with respect to another flat and straight portion 62 of the link 60. That is to say, starting from a straight, elliptical-shaped link with a major axis X and a minor axis Y lying in a plane, an end portion 61 of said link is rotated around the major axis X, in the direction of the arrow F, through an angle θ of about 45°.

In this manner a twisted portion 61 of the link is formed that lies in a plane defined by an axis Z inclined by an angle θ of about 45° with respect to the plane of the flat and straight portion 62 defined by the axes X and Y.

Alternatively, the shape of the last link 60 can be obtained starting from one of the twisted links 11 of the snow chain and straightening one of the twisted ends.

Thanks to this configuration, the twisted portion 61 of the last link 60 can link perfectly with the penultimate twisted link 11 of the portion of chain 10. Instead, the flat and straight portion 62 of the last link 60 can enter the gap between the two flat portions 52 of the U-bolt element, without the need for excessive widening of the U-bolt element 50, resulting in greater bulk.

A locking pin or pivot 55 is then inserted into the aligned holes 53 of the flat portions 52 of the U-bolt element, so as to constrain the last link 60 to the U-bolt element 50.

It should be noted that the U-bolt element 50 can rotate around the core 31 of the inner ring and that the last link 60 of the portion of chain 10 can rotate, with respect to the U-bolt element 50, around the transverse pin 55. Furthermore, the U-bolt system 5 obtained by coupling the U-bolt element 50 with the last link 60 of the portion of chain occupies a reduced thickness on the inner ring 3 and thus does not interfere with the mechanical members of the vehicle.

Returning to FIG. 1, the ends of the core 31 of the inner ring 3 are constrained to two engagement elements 80 and 90 forming part of a closing device 8 of the inner ring, per se known.

The end links of the portions of chain 10 can be connected to the outer ring by means of any per se known connecting system, which therefore is not illustrated. In fact in this case the bulk of the connecting system is less influential.

In the figures a U-bolt element 5 is illustrated, which has such as structure as to be able to constrain a single end portion 60 of a chain portion by means of the pin 55 that engages in the hole 53. However, it is obvious that the structure of the U-bolt element 5 can be modified, providing a more elongated U-bolt element, so as to be able to constrain two or more end portions 60 of chain portions. In this case the elongated U-bolt element must provide two or more holes 53 to receive respective pins 55. In the example in FIG. 2, on the other hand, it is apparent that the two U-bolt elements 50 are very close to one another and can therefore be replaced by a single, longer U-bolt element able to constrain two end links 60 of two portions of chain 10.

Numerous changes and modifications of detail within the reach of a person skilled in the art can be made to the present embodiment of the invention without thereby departing from the scope of the invention set forth in the appended claims.

The invention claimed is:

1. A system (5, 60) for connecting portions of chain (10) to the inner ring (3) of an anti-skid device wherein:
said portions of chain (10) comprise chains with twisted links (11), each twisted link having two opposite portions disposed on two planes at 90° to each other,
said connecting system (5, 60) comprising:
a U-bolt element (50) constrained to said inner ring (3), and an end link (60) defining an end of the portion of chain (10), characterized in that said end link (60) comprises a flat and straight portion (62) connected to said U-bolt element (50) and a twisted portion (61) connected to a twisted link (11) of the portion of chain (10), said twisted portion (61) being inclined by about 45° with respect to the plane on which said flat and straight portion (62) of the end link lies; and in that in that said twisted-link portion of chain comprises a plurality of said twisted links (11), each consisting of a substantially elliptical annular element which is twisted by bending the end parts thereof by 45° in one direction and in the opposite direction around the major axis thereof, so as to give rise to two portions disposed on two planes at 90° to one another.

2. A connecting system (5, 60) according to claim 1, characterized in that said U-bolt element (50) is articulated to the end link (60) of at least one respective portion of chain (10) with twisted links, said U-bolt element (50) consisting of a plate bent into a U-shape around a core (31) of said inner ring (3), so as to be able to rotate around said core (31).

3. A connecting system (5, 60) according to claim 2, characterized in that said U-bolt element (50) is articulated to the end link (60) by means of a pivot or pin (55) mounted in said U-bolt element (50) in a transverse direction with respect to the axis of rotation thereof and in which the flat and straight portion (62) of said end link (60) of the portion of chain is mounted rotatably around said transverse pin (55) of the U-bolt element.

4. A connecting system (5, 60) according to claim 2, characterized in that said U-bolt element (50) comprises a semi-cylindrical portion (51) constructed to be disposed rotatably around the core (31) of the inner ring and two flat portions (52) parallel and spaced apart from each other so as to leave a gap to receive said flat and straight portion (62) of the end link (60) of the portion of chain (10).

* * * * *